(12) United States Patent
Malik

(10) Patent No.: US 7,555,525 B2
(45) Date of Patent: *Jun. 30, 2009

(54) TEMPORARY CONTACT ALIAS SYSTEM

(75) Inventor: Dale W. Malik, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 20 days.

This patent is subject to a terminal disclaimer.

(21) Appl. No.: 11/422,280

(22) Filed: Jun. 5, 2006

(65) Prior Publication Data

US 2006/0227803 A1    Oct. 12, 2006

Related U.S. Application Data

(63) Continuation of application No. 10/217,390, filed on Aug. 13, 2002, now Pat. No. 7,096,255.

(51) Int. Cl.
*G06F 15/16* (2006.01)

(52) U.S. Cl. .............. 709/206; 709/205; 709/223; 709/245; 715/752; 715/758

(58) Field of Classification Search ......... 709/204–207, 709/223, 250, 245; 715/758, 752, 753
See application file for complete search history.

(56) References Cited

U.S. PATENT DOCUMENTS

| 5,058,152 | A  | 10/1991 | Solomon et al. |
|-----------|----|---------|-----------------|
| 5,361,295 | A  | 11/1994 | Solomon et al. |
| 5,590,184 | A  | 12/1996 | London |
| 5,742,905 | A  | 4/1998  | Pepe et al. |
| 5,952,934 | A  | 9/1999  | Matsumoto et al. |
| 6,047,056 | A  | 4/2000  | Patel |
| 6,088,719 | A  | 7/2000  | Murakami |
| 6,272,214 | B1 | 8/2001  | Jonsson |
| 6,327,353 | B1 | 12/2001 | Fukuzawa et al. |
| 6,332,163 | B1 | 12/2001 | Bowman-Amuah |

(Continued)

FOREIGN PATENT DOCUMENTS

JP    11-025012    *    1/1999

(Continued)

OTHER PUBLICATIONS

Malik; U.S. Appl. No. 10/217,915, filed Aug. 13, 2002.

(Continued)

*Primary Examiner*—Oanh Duong
(74) *Attorney, Agent, or Firm*—Thomas, Kayden, Horstemeyer & Risley, LLP

(57) ABSTRACT

A system for providing temporary contact aliases is provided. A representative system includes a database system operable to store at least one resource list comprising a plurality of contacts associated with at least one user. The plurality of contacts comprising at least one temporary contact at the instruction of said at least one user, stored in said at least one resource list associated with said at least one user. The system further includes a network interface operable to communicate with a plurality of users, including said at least one user, over a network which is operable to provide a communication medium between the plurality of users. Methods and other systems for temporary contact alias are also provided.

43 Claims, 6 Drawing Sheets

U.S. PATENT DOCUMENTS

| | | | |
|---|---|---|---|
| 6,360,737 B1 | 3/2002 | Kurtze et al. | |
| 6,393,424 B1 | 5/2002 | Hallman et al. | |
| 6,430,602 B1 | 8/2002 | Kay et al. | |
| 6,445,780 B1 | 9/2002 | Rosset et al. | |
| 6,463,471 B1 | 10/2002 | Dreke et al. | |
| 6,480,885 B1 | 11/2002 | Olivier | |
| 6,513,013 B1 | 1/2003 | Stephanou | |
| 6,519,628 B1 | 2/2003 | Locascio | |
| 6,571,286 B2 | 5/2003 | Fisher et al. | |
| 6,611,498 B1 | 8/2003 | Baker et al. | |
| 6,691,113 B1 | 2/2004 | Harrison et al. | |
| 6,879,994 B1 | 4/2005 | Matsliach et al. | |
| 6,963,845 B1 * | 11/2005 | Lapstun et al. | 705/1 |
| 6,983,317 B1 | 1/2006 | Bishop et al. | |
| 7,003,558 B2 | 2/2006 | Agrusa et al. | |
| 7,092,992 B1 * | 8/2006 | Yu | 709/206 |
| 7,167,918 B2 | 1/2007 | Byrne et al. | |
| 2002/0078007 A1 | 6/2002 | Herrero | |
| 2002/0107925 A1 * | 8/2002 | Goldschneider et al. | 709/206 |
| 2002/0112005 A1 * | 8/2002 | Namias | 709/206 |
| 2002/0138581 A1 * | 9/2002 | MacIntosh et al. | 709/206 |
| 2002/0143879 A1 | 10/2002 | Sommerer | |
| 2002/0147701 A1 | 10/2002 | Chang | |
| 2002/0165815 A1 | 11/2002 | Vincent | |
| 2002/0173306 A1 | 11/2002 | Adamany | |
| 2002/0174237 A1 | 11/2002 | Shrinivasan | |
| 2003/0009439 A1 | 1/2003 | Lee | |
| 2003/0018726 A1 | 1/2003 | Low | |
| 2003/0037112 A1 | 2/2003 | Fitzpatrick | |
| 2003/0065729 A1 | 4/2003 | Leinonen | |
| 2003/0074213 A1 | 4/2003 | Murakami | |
| 2003/0074410 A1 | 4/2003 | Kay | |
| 2003/0108000 A1 | 6/2003 | Chaney | |
| 2003/0126245 A1 | 7/2003 | Feltin | |
| 2003/0156134 A1 * | 8/2003 | Kim | 345/753 |
| 2003/0233415 A1 | 12/2003 | Beyda | |
| 2004/0054428 A1 | 3/2004 | Sheha | |
| 2004/0101123 A1 | 5/2004 | Garcia | |
| 2004/0243844 A1 | 12/2004 | Adkins | |

OTHER PUBLICATIONS

Malik; U.S. Appl. No. 10/217,930, filed Aug. 13, 2002.
Malik; Non- Final Rejection mailed Mar. 16, 2006; for U.S. Appl. No. 10/217,915, filed Aug. 13, 2002.
Malik; Final Rejection mailed Jul. 10, 2007; for U.S. Appl. No. 10/217,915, filed Aug. 13, 2002.
Malik; Examiner Interview Summary Record mailed Sep. 25, 2007; for U.S. Appl. No. 10/217,915, filed Aug. 13, 2002.
Malik; Non- Final Rejection mailed Feb. 27, 2006; U.S. Appl. No. 10/217,930, filed Aug. 13, 2002.
Malik; Notice of Allowance and Fees Due mailed Aug. 2, 2006; U.S. Appl. No. 10/217,930, filed Aug. 13, 2002.
Malik; Notice of Allowance and Fees Due mailed Sep. 1, 2006; U.S. Appl. No. 10/217,930, filed Aug. 13, 2002.
Hamilton; "Use of DNS Aliases for Network Services," RFC 2219, Oct. 1997, p. 1-8.
Rigney; "Remote Authentication Dial in User Service (RADIUS)," RFC 2865, Jun. 2000, p. 1-76.
Zorn; "RADIUS Authentication Server MIB," RFC 2619, Jun. 1999, p. 1-16.
Malik; U.S. Appl. No. 10/217,390, filed Aug. 13, 2002.
Malik; Non-Final Rejection mailed Jul. 30, 2003 for U.S. Appl. No. 10/217,390, filed Aug. 13, 2002.
Malik; Final Rejection mailed Jan. 22, 2004 for U.S. Appl. No. 10/217,390, filed Aug. 13, 2002.
Malik; Examiner Interview Summary Record mailed Feb. 9, 2004 for U.S. Appl. No. 10/217,390, filed Aug. 13, 2002.
Malik; Advisory Action mailed Apr. 7, 2004 for U.S. Appl. No. 10/217,390, filed Aug. 13, 2002.
Malik; Non-Final Rejection mailed Aug. 3, 2004 for U.S. Appl. No. 10/217,390, filed Aug. 13, 2002.
Malik; Final Rejection mailed May 19, 2005 for U.S. Appl. No. 10/217,390, filed Aug. 13, 2002.
Malik; Non-Final Rejection mailed Nov. 30, 2005 for U.S. Appl. No. 10/217,390, filed Aug. 13, 2002.
Malik; Examiner Interview Summary Record mailed Apr. 3, 2006 for U.S. Appl. No. 10/217,390, filed Aug. 13, 2002.
Malik; Notice of Allowance mailed Apr. 3, 2006 for U.S. Appl. No. 10/217,390, filed Aug. 13, 2002.
Malik; Notice of Allowance and Fees Due mailed Jul. 21, 2008 for U.S. Appl. No. 10/217,915, filed Aug. 13, 2002.

* cited by examiner

TEMPORARY CONTACT ALIAS SYSTEM

CROSS-REFERENCE TO RELATED APPLICATION

This application is a continuation of copending U.S. utility application entitled, "Temporary Contact Alias System," having Ser. No. 10/217,390, filed Aug. 13, 2002, which claimed priority to U.S. provisional application entitled, "Integration of Instant Messaging and Computer Operating Systems," having Ser. No. 60/382,106, filed May 21, 2002 which are both entirely incorporated herein by reference.

FIELD OF THE INVENTION

The present invention is generally related to telecommunications and more particularly to services provided to clients via instant messaging applications.

DESCRIPTION OF THE RELATED ART

The development of the internet has driven vast technological developments, particularly in the areas of networking hardware and software. Networking hardware developments have enabled networks to transfer large files in fractions of a second. Software developments, such as the world-wide-web (web) and e-mail, have facilitated communications over these networks have allowed users to remain in almost constant contact with work. These types of communications have become of utmost importance in the business setting, where response time has become a key survival factor for many companies. Other networking software has allowed users to access and run applications from remote locations. Thus allowing a businessperson to remain productive, even while away on a business trip.

Moreover, the internet has changed the way people communicate. E-mail has become the dominant means of communications in many settings, being preferred over traditional mail, and even telephones in some cases. Almost instantaneous transportation with little charge has driven much of the popularity of e-mail. Once used only in university and military settings, e-mail has gained widespread public acceptance in just over twenty years.

In a world economy based upon communication, the relative speed of e-mail in comparison to traditional mail is no longer fast enough. Demand for faster access to more information has resulted in the development of a number of instant messaging (IM) services. IM brings presence information into the communications arena, and allows users to have real-time chat sessions with other users who are present on the system. The real-time nature of IM has quickly lead to acceptance from many in the business community as an invaluable tool for communication. However, there has been no tool that has integrated the computer and the IM services.

Therefore, there is a need for systems and method that address these and/or other perceived shortcomings of the prior art.

SUMMARY OF THE INVENTION

One embodiment, among others, of the present invention provides systems and methods for providing temporary contact aliases in a resource list. A representative system includes a database system operable to store at least one resource list comprising a plurality of contacts associated with at least one user. The plurality of contacts including at least one temporary contact at the instruction of said at least one user stored in said at least one resource list associated with said at least one user. The system further includes a network interface operable to communicate with a plurality of users, including said at least one user, over a network which is operable to provide a communication medium between the plurality of users.

A method, among others, to store temporary contacts includes: receiving a request from a user to add a temporary contact to a network resource list associated with the user; storing the temporary contact in the network resource list; and, removing the temporary contact upon expiration of the temporary contact.

A method, among others, to create temporary contacts includes: sending a request to a database system to create a temporary contact on a network resource list; and providing a set of details about the temporary contact.

Other systems, methods, features, and advantages of the present invention will be or become apparent to one with skill in the art upon examination of the following drawings and detailed description. It is intended that all such additional systems, methods, features, and advantages included within this description and within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

The preferred embodiments of the present invention now will be described more fully with reference to the accompanying drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

Figure 1A:
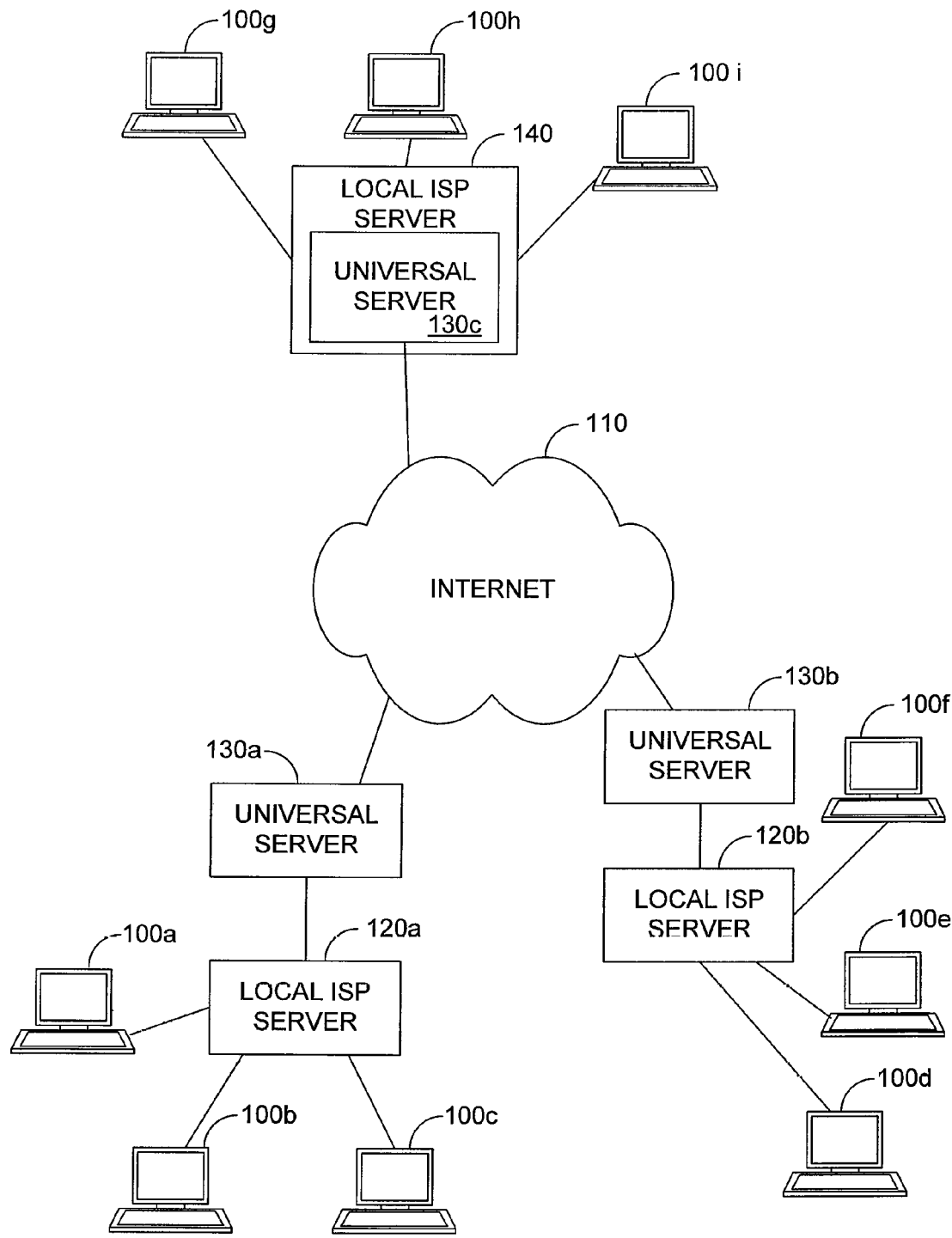
FIG. 1A is a block diagram illustrating an interoperability architecture for instant messaging used in one embodiment, among others, of the present invention.

Referring now to FIG. 1A, shown is a block diagram illustrating an interoperability architecture for instant messaging used in one embodiment, among others, of the present invention. Each of a plurality of remote computers 100a-i access a network 110 through a local internet service provider (ISP) server 120a, 120b, 140. The local ISP 120a, 120b, 140 can offer network 110 access through myriad connection types, including a digital subscriber line (DSL) service, an integrated services digital network (ISDN) service, an analog dial-up service, ethernet, T-1, or any other service for transmitting data through a network 110. Universal servers 130a-c are located between the internet and each of local ISP servers 120a, 120b, and located inside local ISP 140. These universal servers 130a-c provide interoperability between a plurality of proprietary instant messaging clients 100a-i. Of course, the scope of the presentation includes networks other than those with universal servers or instant messaging.

Figure 1B:
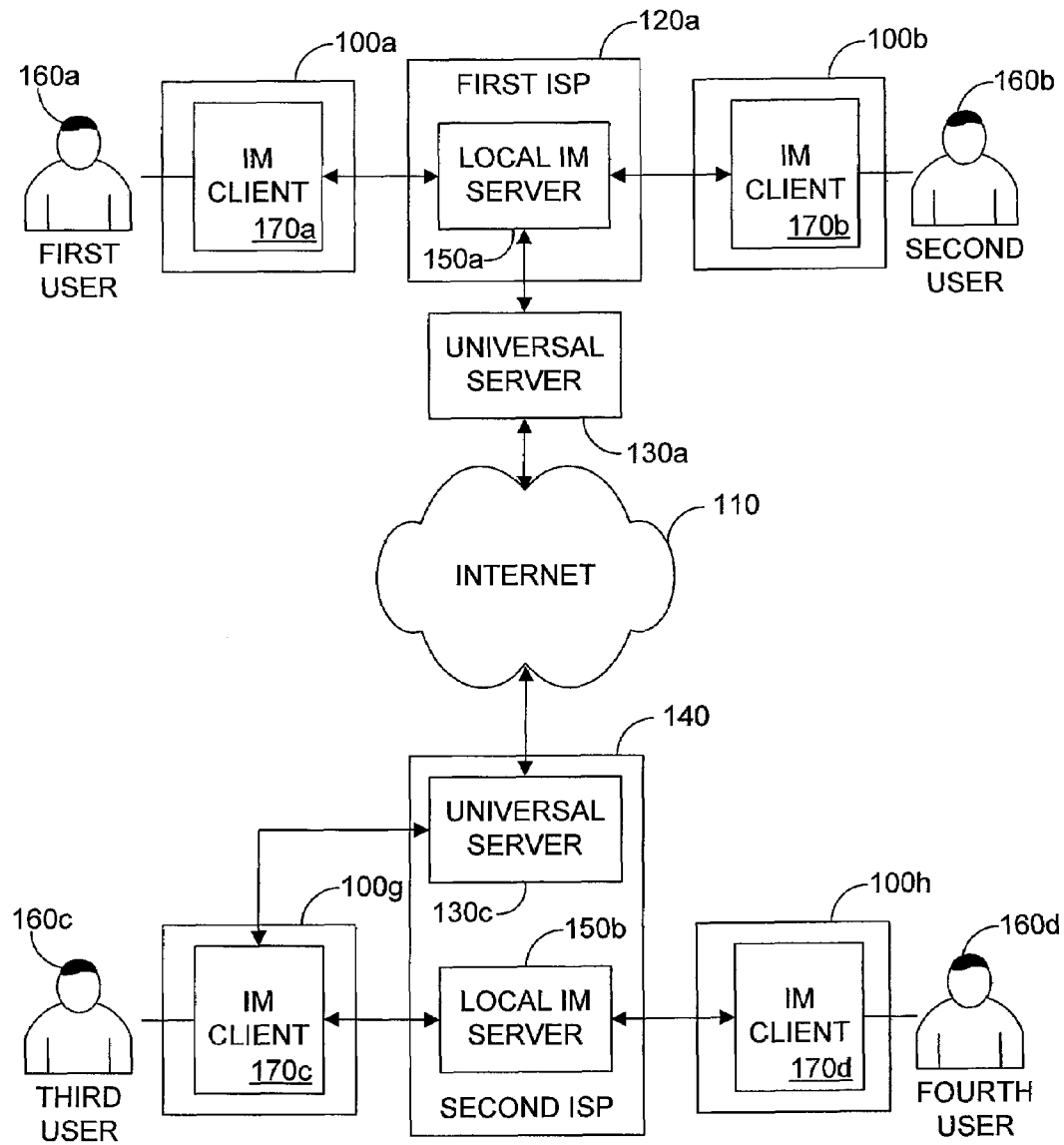
FIG. 1B is a block diagram illustrating an alternative embodiment, among others of an interoperability architecture for instant messaging used in one embodiment, among others, of the present invention.

Referring now to FIG. 1B, shown is an illustration of an alternative embodiment, among others, of a universal architecture. Greater detail regarding this interoperability architecture may be found in U.S. patent application Ser. No. 10/135,929, entitled "Instant Messaging Architecture and System for Interoperability and Presence Management," which is hereby incorporated by reference. The universal architecture uses a universal protocol, such as the extensible markup language (XML) protocol to allow users of different ISPs 120a, 140 that use proprietary protocols to communicate with one another. Universal servers 130a, 130c located at each of the ISPs 120a, 140 are the key feature of the universal architecture. FIG. 1B illustrates two separate ISP networks 120a, 140. The discussion of the ISP 120a, 140 will be limited to the components that provide the universal service.

The ISP 120a contains a local IM server 150a, and is connected to the universal server 130a. The local IM server 150a provides the standard IM function for the ISP 140a. The universal server 130a provides the universal function that allows the first user 160a, who is registered with the first ISP 120a, to communicate with a second user 160b registered with the second ISP 140. The first ISP 120a provides connections to a plurality of clients 170a, 170b on computers 100a, 100b, which allows users 160a, 160b to access the proprietary IM and universal functions of the ISP 120a. The first ISP 120a is "bimodal," in that it uses both a proprietary and universal format to provide a proprietary IM function that only allows the users who are registered with the ISP 120a to send and receive instant messages. For example, if only one user has registered with the universal server 130a, then the local IM server 150a will transfer instant messages between the first and second users 160a, 160b using the proprietary protocol. However, if both the first and second users 160a, 160b are registered with the universal server 130a, then the first ISP 120a can transfer instant messages between them using the universal protocol. By supporting both formats at the first ISP 120a, users can migrate to the universal format over time. When all users 160a, 160b have migrated the proprietary format can be discontinued.

The universal server 130a removes the restrictions associated with proprietary IM functions associated with the ISP 120a. The universal server 130a uses a universal format, such as XML, or any other suitable format, that allows users 160a, 160b registered with an ISP 140a, such as BellSouth DotNet, to send and receive instant messages from other users 160c, 160d registered with another ISP 140b, such as America Online (AOL).

The user 160a accesses the local IM server 150a of the ISP 120a through the IM client 170a located on the user's computer 100a. The IM client 170a typically includes a proprietary software program that is capable of opening communications sockets that allow the IM client 170a to communicate with the local IM server 150a using either the proprietary or universal protocols. The software program is capable of formatting an instant message sent from the IM client 170a to the appropriate format used by the IM function of the ISP 120a. In this manner, the user 170a is capable of communicating with any other user 160b registered with the ISP 120a. However, the local IM server 150a on a first ISP 120a is also connected to a first universal server 130a. The first universal server 130a is in turn, connected to a second universal server 130b on the second ISP 140b via a distributed network, such as the internet 110. This allows the user 160a to communicate not only with the user 160b who is registered with the first ISP 120a, but also with users 160c who are registered with the second ISP 140 that uses a different proprietary IM protocol to send and receive instant messages within the network of the second ISP 140.

In order for the first user 160a to be able to send and receive messages with a third user 160c on the second ISP 140, the IM client 170a must be able to identify the IP address and presence information associated with the third user 160c. The presence information for the third user 160c is stored on the universal server 130a connected to the first ISP 120a. The universal server 130a on the first ISP 120a stores the IP address and presence information for the third user 160c. Therefore, the first user 160a, who is registered with the universal server 130a on the first ISP 120a has access to the IP address and presence information of the third user 160c.

One skilled in the art will recognize the difference between the first local ISP 120a and the second ISP 140. The second local ISP 140 is an alternative embodiment that includes within the ISP 140 both the universal server 130c and a local IM server 150b. Here, the local IM server 150b does not communicate with the universal server 130c. Thus, the first user 160a will not be able to communicate with a fourth user 160d if the fourth user 160d is not registered with the universal server 130b, but instead is only registered with a local IM server 150b. As a result, the fourth user 160d is able to send and receive instant messages using only the proprietary format over local IM server 150b. Therefore, the user 160d is limited to communicating via instant messages with users of the second ISP 140b, such as the third user 160c.

An advantageous feature of the universal architecture is that it is designed to be easily integrated within existing ISPs 120a, 140, such as AOL and Microsoft Network (MSN) without disrupting the current IM function of these ISPs 120a, 140. Each ISP 120a, 140 that adopts the universal architecture requires only a slight modification to the existing network. The ISP 120a, 140 either adds a universal server 130a between the local IM server 150a and the internet 110, or adds an additional server to function as the universal server 130b and can install a universal application program on the local IM server 150a, 150b and each IM client 170a-d attached to the network. The universal application program that is installed at each ISP 120a, 140 converts the ISP 120a, 140 to function as "bimodal." That is, the ISP 120a, 140 is capable of using the proprietary IM protocol of the local IM server 150a, 150b and the universal protocol of the universal architecture. The bimodal nature of the universal architecture allows the universal server 130a, 130b to be implemented into existing ISPs 120a, 140 such as AOL and MSN without disrupting the current proprietary IM functions of those services. This allows the current users 160a-d to continue using the proprietary IM function of their particular ISP 120a, 140 until every user 160a-d can be converted to the universal protocol.

Figure 2:
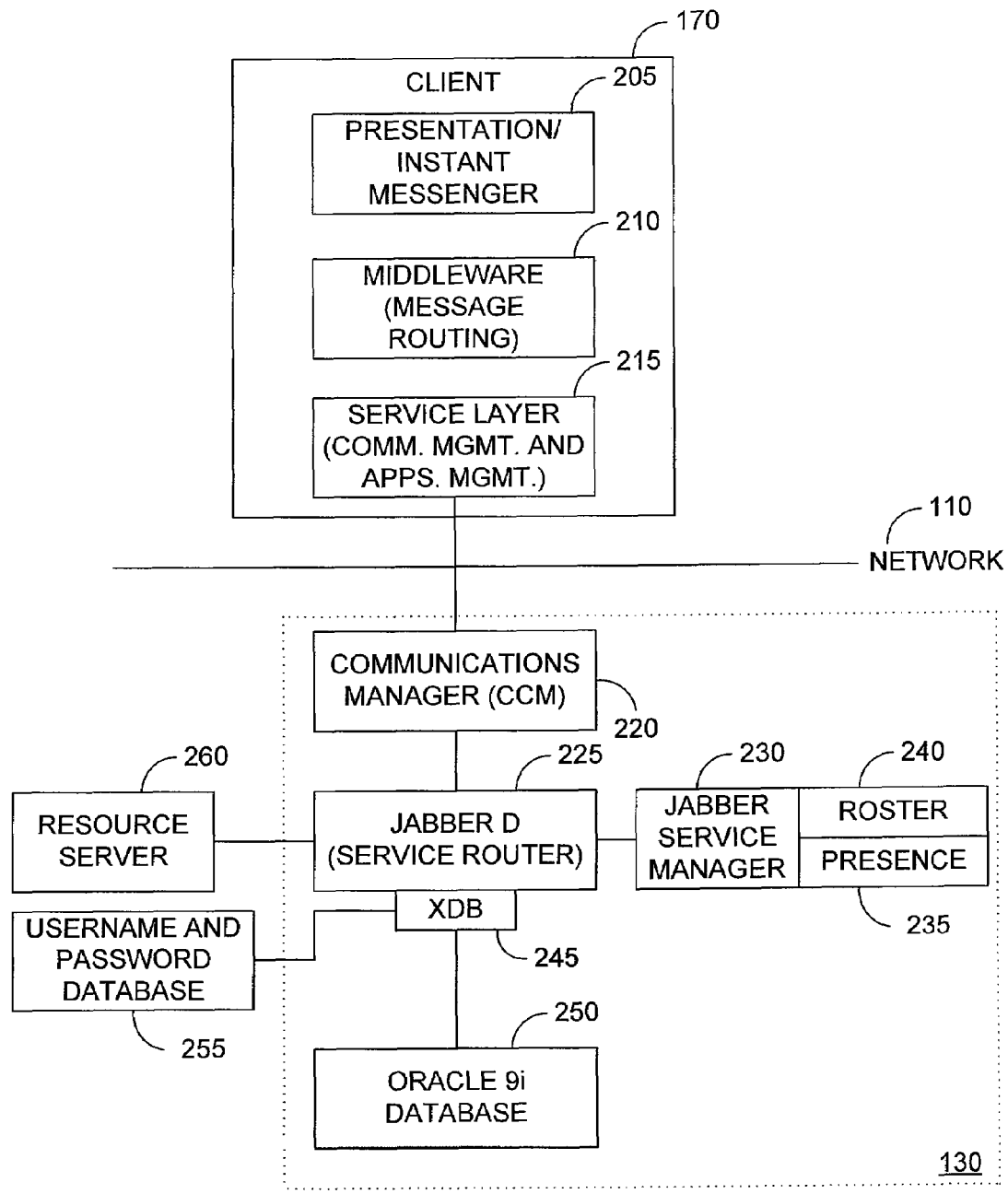
FIG. 2 is a block diagram of the interoperability architecture used in one embodiment, among others, of the present invention.

Referring now to FIG. 2, shown is a block diagram illustrating an embodiment, among others, of the universal server 130 of FIGS. 1A & B, which is used in conjunction with an embodiment, among others, of the present invention. The client 170 includes at least three layers of functionality in one embodiment, among others, to communicate with the universal server 130. The first layer is the presentation layer 205. The presentation layer 205 includes the logic that is used to present the instant messenger or another application to a user. The second layer is a middleware layer 210. The middleware layer 210 includes logic used to handle the message routing of the instant messaging application between the presentation layer and the service layer. The third layer is the service layer 215. The service layer 215 handles both the applications management and communications management of the client. The service layer 215 communicates with the communications layer 220 on the universal server 130.

Preferably, there are three basic layers to the instant messaging service. The first layer is the communications manager (CCM) 220. The communications manager 220 manages the connections between the client communications manager 215 and the universal server 130. In one embodiment, among others, of the universal server 130, communications between the client service layer 215 and the universal server 130 communications manager 220 occur in extensible markup language (XML). Further, the communications may be secure socket layer (SSL) encrypted for security. Moreover, the communications can be compressed by a compression/decompression algorithm implemented on a compression-decompression module, more commonly referred to as a CODEC, to provide faster data transfer.

The communications manager 220 includes a number of connection sockets between the communications manager 220 and a plurality of users. The communications manager 220 can further include a load balancer (not shown) to balance the connections over a number of different communications managers. The load balancer can maintain a connection to the same connection socket during the period while the user is logged on and connected to an operable communications manager 220, and can automatically connect the user to an alternate connection socket when a communications manager might fail. Thus, a continuous connection can be maintained during an active session despite hardware failures. The load balancer can also protect the serves against denial of service attacks, which have become increasingly prevalent on the internet.

A standard communications manager 220 will typically attempt to recover and reallocate a connection socket after a period of time with no activity from the client 170. In this situation the communications manager 220 assumes that the client is no longer present on the system. However, because presence is an important piece of the instant messaging architecture, the communications layer 215 on the client-side sends a signal to the universal server 130 to keep the connection socket active on the communications manager 220.

The second layer is the service router 225, with one example known as a JabberD in the Jabber architecture, such as that available from Jabber, Inc. of Denver, Colo., which performs a similar function to the message router 210 on the client side of the network. A number of different service managers 230 can be coupled to the service router 225, each of which can provide a different service to the client 170 over the internet. Thus when a service is requested, the service router 225 routes the request to the requested service manager 230. In the instant messaging architecture the service manager 230 is a Jabber service manager (JSM) which allows text communication between parties. The JSM 230 also keeps track of presence and roster information 235, 240, respectively, for a particular user on the network who has logged into the instant messaging system. Presence 235 typically refers to the user's status on the network, while roster 240 typically refers to the status on the network of those on the user's resource list.

Similarly to the communications manager 220, the service router 225 can utilize a self-similar architecture using the CODEC (not shown) and load balancer (not shown) to optimize the connection between the communications manager 220 and the service router 225. Use of the CODEC enables high speed data transmission between the communications manager 220 and the service router 225. The load balancer provides a robustness that allows the client to maintain contact with a selected service manager 230 during a session.

In one embodiment, among others, of the universal server 130, the database containing the non-persistent data, such as presence and roster information 235, 240, can be severed from the service manager 230. The presence information 235 typically includes a list of all users who are registered with the universal server 130, while the roster list includes a non-persistent list of those resource which are present on the network. Thus, the non-persistent data can be maintained and updated at a single database, and the plurality of service routers 225 can connect to the same presence information 235. After severing this database from the service manager 230 the service manager 230 can be equipped, as described above, with a CODEC (not shown) and load balancer (not shown), again utilizing a self-similar architecture to provide quality of service and communication efficiencies.

The service router 225 is further coupled, in one embodiment, among others, to an XML database (XDB) library 245. The XDB library 245 is used as a translator such that the service router 225 can communicate with a database system 250 that includes persistent data relating to a plurality of clients. The database system 250 which contains most of the persistent data for the services on the network, such as resource lists, preferences, etc. In one embodiment, among others, of the universal server 130 the database system 250 can be an Oracle 9i database. The XDB library 245 can be further coupled to an authentication server, such as a username and password database 255. Thus a username and password can be required before the user is authenticated and allowed to access the database system 250 for any profile information.

After registering with the database system 250, the user is provided with a resource list. The client 170 can then contact the service manager 230 to find out which of the resources on the resource list is present and/or available on the network. Typically, presence refers to the registration state of a client 170. If a client 170 is logged-in to the network, the client 170 is present on the network. Typically, availability refers to the status of a user at the client computer. A user can be made unavailable by the network if there has been no activity on the client computer 170 for a period of time. Otherwise, a client 170 can be made unavailable by user choice, if the user does not wish to be disturbed. One skilled in the art will recognize that these are merely definitions of various states that can be defined according to any specific implementation of the presence and roster databases 235, 240. Furthermore, these databases 235, 240 that contain non-persistent information could keep track of any other states that might be defined by the specific implementation of the service manager 230.

Typically with respect to other instant messaging systems, the resource list only comprises a list of other users for which the client 170 wishes to know the status. However, the resource list of some embodiments of the present invention could include access to a plurality of applications, and there could be multiple service managers that include managers for the plurality of applications coupled to the service router 225. These service managers could provide access to a multitude of different applications and resources, such as Microsoft Word and/or Visio, provided by Microsoft Corp. of Redmond, Wash., and/or billing entry applications, etc. Moreover, the Jabber service manager 230 could keep track of the presence of these other applications and other resources on the network. For example, if a client wished to access an e-mail account from a remote location and the system was down, the Jabber service manager 230 could alert the user that the server was down. Thus the client 170 would not waste resources searching and waiting for e-mail from a server that is off-line.

Thus, Jabber can be used similarly to an operating system. When a resource server 260 is present on the network, the resource(s) associated with that resource server can be displayed as an icon on the client computer display, and when a resource server is down, the resource(s) can be removed from the client computer 170 display. Thus, icons, for example, could appear and disappear from a client computer 170 display as they become present and available, and not present or unavailable. Selecting the icon while it is displayed will cause a routing request to be sent to the service router 225. Upon receiving the routing request, the service router 225 will determine the correct routing of the routing request and deliver the proper service to the client computer 170.

Figure 3:
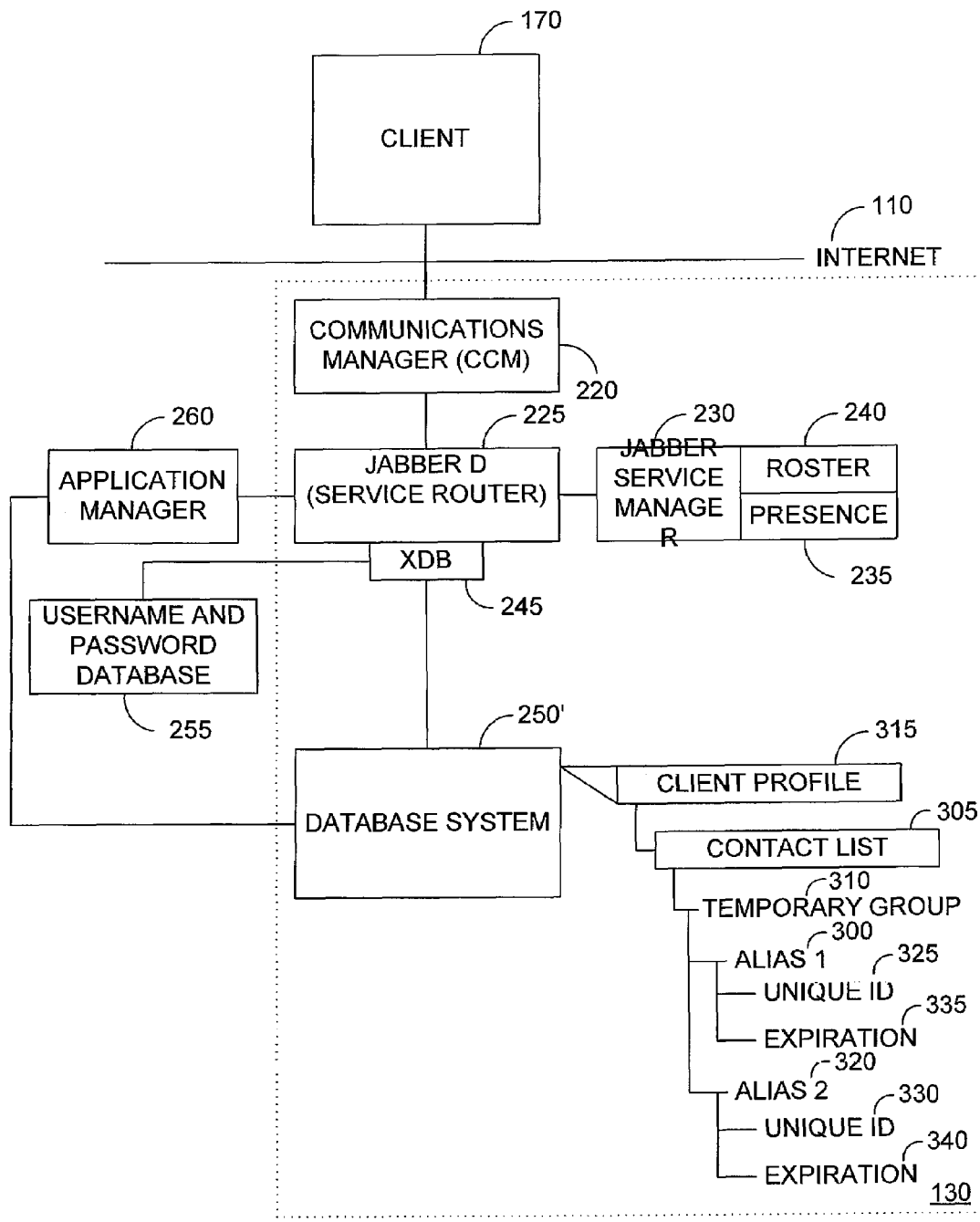
FIG. 3 is a block diagram showing an embodiment, among others, of a system of the present invention for providing temporary instant messaging contact aliases.

Referring now to FIG. 3, shown is a block diagram illustrating an embodiment, among others, of a system of the present invention for providing temporary contact aliases. In this embodiment, the universal server 130 includes a database system 250', which is operable to store a temporary contact alias 300 for a limited duration. When the temporary contact 300 expires, the temporary contact alias 300 is removed from the client resource list 305.

In one embodiment, among others, of the present invention a temporary group 310 can be added to the client profile 315. The temporary group 310 will include contact aliases 320, 325 which the user desires to keep only for a limited period of time. The temporary group 310 could contain, for example, aliases 300, 320 linked to respective unique identifications 325, 330, such as a jabber identification or e-mail address, and respective expiration periods 335, 340. The user could specify the expiration period 335, 340 or the universal server 130 could default to some period of time, both of which could be extendable indefinitely by the user through the client 200. Such a system could be useful in keeping a resource list 305 from becoming cluttered and unusable. Furthermore, it allows the client to control how long a contact 300 is stored in his or her profile 315 without requiring the user to actively monitor and remove old contacts.

In one embodiment, among others, of the present invention, the user could add a temporary contact 300 to his/her resource list 305 by searching for a user and use a drag-and-drop mechanism to add the contact 300 into the user's temporary group folder 310. Upon an attempt to add the contact 300 to the temporary group 310 in this manner, the universal server 130 would prompt the user to enter an expiration time or event 335. Alternatively, the user could add a contact 300 manually through a menu interface, such as by choosing to "add new contact" from the menu list. The universal server 130 or the client 170 application could then prompt the user about the details of the contact 300, including: contact's unique identification 325, temporary status, expiration 335, etc. In a further alternative embodiment, among others, a temporary contact 300 may be added or removed by an event stimulus. Such an event stimulus could include: accepting a file transfer from another user; closing a service ticket; client logout; or beginning/ending a chat session.

Furthermore, a temporary contact could be added when a first user requests to be added to be added to a second user's resource list 305. Upon receiving this request to be added to the second user's resource list 305, the universal server 130 can queue a prompt for the second user, alerting him/her of the request to add the first user to the second user's resource list 305. The second user could then be given a choice as to whether or not to add the first user to his/her resource list 305, and moreover, whether the first user should be added to the temporary group 310.

Typically, the temporary contact 300 can be removed through the mechanism of the service manager 230. When a user logs on to the universal server 130, the service manager 230 reads the profile 315 from the database. Upon reading the profile 315 the service manager 230 could check the expiration periods 335, 340 of the temporary group 310 to ensure that no temporary contacts 300, 320 have expired. If any of the temporary contacts 300, 320 have expired, the service manager 230 can send a request to the database 250' to remove the expired temporary contact.

Alternatively, a server (not shown) could be attached to the database 250' which monitors the expiration of a plurality of temporary contacts 300, 320. Then when an temporary contact 300, 320 expires the server can automatically remove the temporary contact 300, 320 from the user profile 315. Thus, the next time the user logs in to the universal server 130, the resource list 305 sent to the client 170 will not include the temporary contact 300, 320.

In a further alternative embodiment, among others, of the present invention, the user could be prompted upon the expiration of a temporary contact 300, but prior to the removal of the temporary contact 300. This prompt could afford the user the opportunity to add the temporary contact 300 to the regular resource list 305 (i.e. no expiration) or to extend the expiration of the temporary contact. Thus, for example, if the user had added a temporary contact because they are having their car serviced, the temporary contact will not be automatically deleted in the event that the service shop keeps the car longer than expected. Instead, upon the expiration of the service shop temporary contact, the service manager 230 could send a prompt to the user to ascertain whether the temporary contact should be removed. So, in the situation where the service shop is keeping the car, the user would respond to the service manager 230 instructing the service manager 230 to delay the expiration date.

Figure 4:
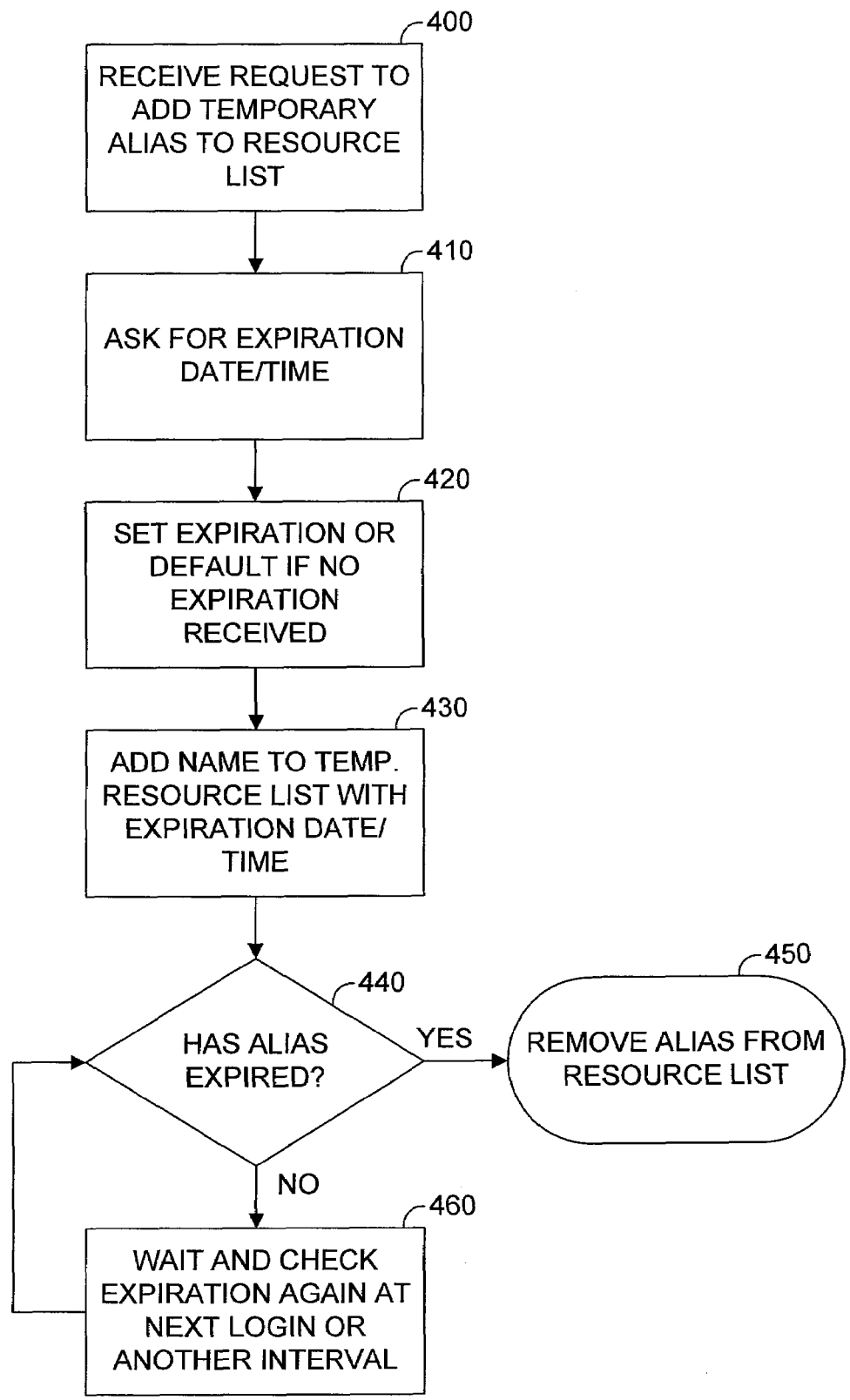
FIG. 4 is a flowchart illustrating an embodiment, among others, of the operation of the system of FIG. 3.

Referring now to FIG. 4, shown is a flowchart illustrating one embodiment, among others, of a flowchart illustrating the operation of the system of FIG. 3. The first step 400 in the operation is receiving a request to add a temporary contact 300 to the resource list 305. The universal server 130 can, in the next step 410, prompt the client 170 for an expiration date 335 for the temporary contact 300 to be stored in the resource list 305. In accordance with the next step 420, a default expiration period 335 for the temporary contact 300 can be set if the user does not specify an expiration 335. When a expiration date 335 is received, in the next step 430, the temporary contact 300 is recorded into the database system 250' along with a link to the unique identifier 325 and expiration date 335. The universal server 130 then checks if the temporary contact 300 is expired, in accordance with the next step 440. If the temporary contact 300 is expired, the next step 450 is to remove the temporary contact 300 from the resource list 305. However, if the temporary contact 300 is not expired, the universal server 130 can, according to the next step 460, wait and check for expiration again at the next login or a regular intervals. One skilled in the art will recognize that the universal server 130 can prompt the user about the permanence of a contact when a request to add a contact is received by the universal server 130. Moreover, the universal server 130 can prompt the user before removal of a temporary contact to confirm the removal or extension of an expired temporary contact.

Figure 5:
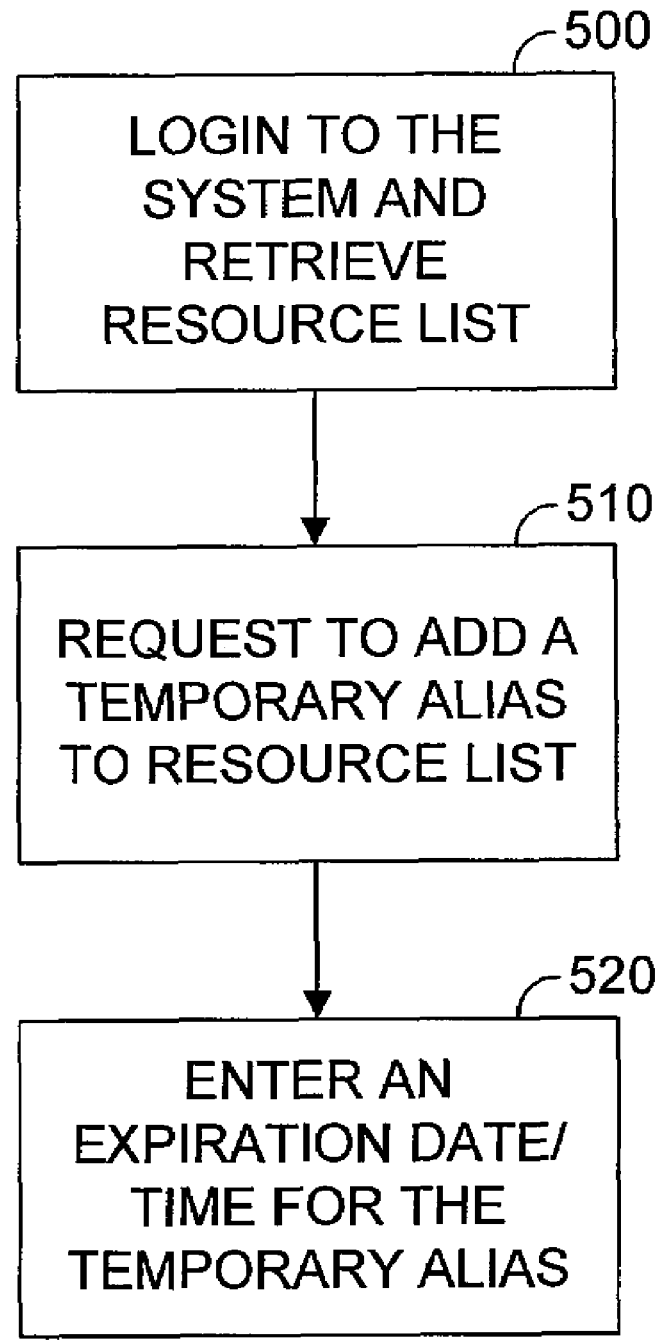
FIG. 5 is a flowchart illustrating an embodiment, among others, of a method of using the system of FIG. 3.

Referring now to FIG. 5, shown is an embodiment, among others, of a flowchart illustrating a method of using the system of FIG. 3. The first step 500 is to login to the universal server 130. The next step 510 of the method is to request to add a temporary contact 300 to the client 170 resource list 305. This can be done automatically by dragging-and-dropping the contact into the resource list, or by merely adding the contact manually to the resource list using the program menu interface. Then the user can enter the expiration date/time 335 for the temporary resource list. After entering the temporary contact unique identification 325 and expiration 335, the universal server 130 will add the temporary contact 300 to the database system 250'.

The retrieval method is not shown in the present embodiment, however, the next time the client logs-on to the universal server 130, the client 170 will request its resource list 305. The service manager 230, after receiving the resource list 305 through the client 200, will check the temporary group 310 to assure that none of the temporary contacts 300, 320 have expired. If any of the temporary contacts 300, 320 have expired, the service manager 230 will send a request to the database system 250' to remove the expired contacts from the resource list 305 and send an updated resource list 305 to the client computer 200. If none of the contacts 300, 320 have expired, the service manager 230 will merely send the current resource list 305, including the temporary contacts 300, 320 to the client computer 170 with status information regarding the resource list 305.

One skilled in the art will recognize that there are many alternative ways to design a database to implement the temporary contact alias systems described above. Each of these alternative mechanisms to add a temporary link to a resource list are intend to be included within the disclosure of the present application.

Process and function descriptions and blocks in flow charts can be understood as representing, in some embodiments, modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should be emphasized that the above-described embodiments of the present invention are merely possible examples of implementations set forth for a clear understanding of the principles of the invention. Many variations and modifications may be made to the above-described embodiment(s) of the invention without departing substantially from the principles of the invention. All such modifications and variations are intended to be included herein within the scope of this disclosure and the present invention and protected by the following claims.

What is claimed is:

1. A system embedded in one or more computer readable storage mediums for providing a temporary contact alias, the system comprising:
    a database system operable to store at least one resource list comprising a plurality of contacts associated with at least one user, the plurality of contacts comprising at least one temporary contact at the instruction of said at least one user stored in said at least one resource list associated with said at least one user and at least one non-temporary contact, the at least one temporary contact being assigned an expiration period as the at least one temporary contact is added to the resource list and the at least one non-temporary contact not having an expiration period;
    a network interface operable to communicate with a plurality of users, including said at least one user, over a network which is operable to provide a communication medium between the plurality of users;
    a service manager component operable to notify the at least one user associated with the resource list of an accessibility of each of the plurality of contacts on the resource list;
    the service manager component operable to provide the at least one user an option of converting the at least one temporary contact to a permanent contact not having the expiration period upon the expiration of the at least one temporary contact, but prior to removing of the at least temporary contact.

2. The system of claim 1, wherein:
    the service manager component is operable to remove said at least one temporary contact from said at least one resource list after an expiration date of said at least one temporary contact.

3. The system of claim 2, wherein the expiration date is a default time period.

4. The system of claim 2, wherein the expiration date is set by said at least one user with whom said at least one resource list is associated.

5. The system of claim 2, wherein the expiration date is set by a pre-determined period of non-use by said at least user with whom said at least one resource list is associated.

6. The system of claim 1, wherein:
    the service manager component is operable to add or remove said at least one temporary contact from said at least one resource list upon the occurrence of an event stimulus, the event stimulus comprising at least one of accepting a file transfer, closing of a service ticket, client logout, beginning of a chat session, and ending of a chat session.

7. The system of claim 1, wherein:
    the service manager component is operable to remove said at least one temporary contact from said at least one resource list associated with the first user after an expiration date of said at least one temporary contact and confirmation with said at least one user.

8. The system of claim 7, wherein the service manager component is further operable to extend the expiration date of said at least one temporary contact until confirmation of removal is received from said at least one user.

9. The system of claim 1, further comprising:
    a means for removing said at least one temporary contact from said at least one resource list after expiration of said at least one temporary contact.

10. The system of claim 1, wherein the network is used by the plurality of users to communicate with other users.

11. The system of claim 10, wherein a one resource list is operable to connect said at least one user associated with said at least one resource list to a second user.

12. The system of claim 11, wherein the connection between said at least one user and a second user is facilitated by a chat application.

13. The system of claim 1, wherein the database system is operable to store a unique identification associated with each of the plurality of contacts.

14. The system of claim 13, wherein the unique identification is an e-mail address, the e-mail address being associated with one of the plurality of contacts.

15. The system of claim 14, wherein the unique identification is a Jabber identification.

16. The system of claim 1, wherein the accessibility of a contact is updated in response to a change in a presence status on the network.

17. The system of claim 16, wherein the accessibility of a contact is further updated in response to a change in an availability status on the network.

18. The system of claim 1, wherein the network interface is further operable to receive a request from a second user to add the second user to said at least one resource list associated with said at least one user, and add the second user to said at least one resource list associated with said at least one user.

19. The system of claim 18, wherein the second user is added to said at least one resource list associated with the first user upon approval from the first user.

20. A computer implemented method for storing temporary contacts, comprising:
receiving, by a communication manager, a request from a user to add a temporary contact to a network resource list including a plurality of contact associated with the user, the network resource list further comprising at least one non-temporary contact;
storing, by a database system, the temporary contact in the network resource list; and
providing the user an option of converting the temporary contact having an expiration period to a permanent contact not having an expiration period upon the expiration of the temporary contact, but prior to removing of the temporary contact, the temporary contact being assigned the expiration period as the temporary contact is added to the network resource list and the at least one non-temporary contact not having an expiration;
checking the accessibility of the plurality of contacts; and
notifying the user associated with the network resource list about accessibility of the contacts.

21. The method of claim 20, further comprising:
prompting the user associated with the network resource list to enter an expiration for the temporary contact; and
removing the temporary contact in response to the expiration.

22. The method of claim 20, further comprising:
removing the temporary contact from the network resource list upon expiration of a pre-set period of time.

23. The method of claim 20, further comprising:
removing the temporary contact from the network resource list upon a pre-determined period of non-use by a user associated with the resource list.

24. The method of claim 20, wherein receiving a request to add a temporary contact comprises:
sensing an event stimulus; and
initiating a request upon sensing the event stimulus, the event stimulus comprising at least one of accepting a file transfer, closing of a service ticket, client logout, beginning of a chat session, and ending of a chat session.

25. The method of claim 20, further comprising:
removing the temporary contact from the network resource list upon occurrence of a pre-determined event.

26. The method of claim 20, further comprising:
connecting a chat session between a first user associated with the network resource list and a second user upon the first user selecting the second user from the network resource list.

27. The method of claim 20, wherein the temporary contact comprises a handle and a unique identifier.

28. The method of claim 27, wherein the unique identifier comprises an e-mail address.

29. The method of claim 27, wherein the unique identifier comprises a Jabber identification.

30. The method of claim 20, wherein accessibility is determined in response to the presence of a contact on the network.

31. The method of claim 30, wherein accessibility is further determined in response to the availability of a contact on the network.

32. The method of claim 20, wherein the request is prompted by a first user requesting to add the first user to the network resource list of a second user.

33. A computer implemented method for creating temporary contacts, comprising:
sending, by a client on a computer, a request to a database system to create a temporary contact on a network resource list, the network resource list further comprising at least one non-temporary contact;
providing a set of details about the temporary contact, the set of details comprising an expiration period assigned to the temporary contact as the temporary contact is added to the network resource list, wherein the at least one non-temporary contact does not have an expiration period;
requesting an accessibility status of a plurality of contacts on the network resource list; and
providing a user an option of converting the temporary contact having the expiration period to a permanent contact not having the expiration period upon the expiration of the temporary contact, but prior to removing of the temporary contact.

34. The method of claim 33, wherein the set of details further comprises a unique identification of the temporary contact.

35. The method of claim 34, wherein the unique identification is the e-mail address of the temporary contact.

36. The method of claim 33, wherein the set of details further comprises a handle associated with the temporary contact.

37. The method of claim 33, wherein the accessibility status depends upon a presence status of a user on a network.

38. The method of claim 37, wherein the accessibility status further depends upon an availability status of the user on the network.

39. The method of claim 38, further comprising:
selecting a contact from the plurality of contacts; and
using a network to chat with the contact.

40. The method of claim 39, further comprising:
using an instant messaging client to facilitate chatting with the contact.

41. The method of claim 33, wherein the request is initiated when a user clicks on an icon and drags and drops the icon into a temporary group folder.

42. The method of claim 33, further comprising:
using an event stimulus to initiate a request to add the temporary contact, the event stimulus comprising at least one of accepting a file transfer and beginning of a chat session.

43. The method of claim 33, further comprising:
using an event stimulus to remove the temporary contact, the event stimulus comprising at least one of closing of a service ticket, client logout, and ending of a chat session.

* * * * *